(12) United States Patent
Wentworth et al.

(10) Patent No.: US 7,784,475 B2
(45) Date of Patent: Aug. 31, 2010

(54) HIGH PRESSURE ARCH FOR A VEHICLE WASH SYSTEM

(75) Inventors: Robert J. Wentworth, Farmington Hills, MI (US); Lionel Belanger, Northville, MI (US)

(73) Assignee: Motor City Wash Works, Inc., Northville, MI (US)

( * ) Notice: Subject to any disclaimer, the term of this patent is extended or adjusted under 35 U.S.C. 154(b) by 352 days.

(21) Appl. No.: 12/033,211

(22) Filed: Feb. 19, 2008

(65) Prior Publication Data
US 2009/0205691 A1    Aug. 20, 2009

(51) Int. Cl.
*B08B 3/02* (2006.01)
(52) U.S. Cl. .......................................... 134/123; 134/18
(58) Field of Classification Search .................. 134/123, 134/18
See application file for complete search history.

(56) References Cited

U.S. PATENT DOCUMENTS

| | | | |
|---|---|---|---|
| 4,718,439 A | 1/1988 | Gorra et al. | |
| 4,726,388 A | 2/1988 | Swinehart et al. | |
| 4,856,543 A | 8/1989 | Petit | |
| 5,016,662 A | 5/1991 | Crotts et al. | |
| 5,020,556 A | 6/1991 | Lamminen et al. | |
| 5,601,133 A | 2/1997 | Krupke et al. | |
| 5,806,542 A * | 9/1998 | Hoffer et al. | 134/57 R |
| 5,964,270 A | 10/1999 | Kirkey et al. | |
| 6,000,631 A | 12/1999 | Lamminen et al. | |
| 6,277,207 B1 | 8/2001 | Gauthier | |
| 6,425,407 B2 | 7/2002 | Jones et al. | |
| 6,595,221 B2 | 7/2003 | Jones et al. | |
| 2006/0157093 A1 | 7/2006 | Belanger | |

* cited by examiner

*Primary Examiner*—Michael Cleveland
*Assistant Examiner*—Samuel A Waldbaum
(74) *Attorney, Agent, or Firm*—Dickinson Wright PLLC (57) ABSTRACT

A vehicle treatment apparatus for a vehicle cleaning system includes a frame structure having a pair of vertical side supports that are secured to the ground and are spaced apart from one another. The pair of vertical side supports have a generally horizontal treatment member extending therebetween. The horizontal treatment member has a first end and a second end and is configured to communicate with a vehicle that passes thereunder. Each of the pair of vertical side supports include a retention mechanism formed therein for engaging a respective one of the first end and the second end of the generally horizontal treatment member. The generally horizontal treatment member is in communication with a controller to allow substantially vertical movement within each of the retention mechanism from a home position to at least one lower position where it communicates with the vehicle. The generally horizontal treatment member is in communication with a sensor to monitor application of a force thereto. If the force applied to the generally horizontal treatment member is greater than a predetermined minimum acceptable force, the generally horizontal treatment member moves vertically upward to the home position and automatically repositions the end in the event the force applied to the horizontal treatment member is sufficient to dislodge the ends from their retention mechanism.

24 Claims, 8 Drawing Sheets

HIGH PRESSURE ARCH FOR A VEHICLE WASH SYSTEM

BACKGROUND OF THE INVENTION

1. Field of the Invention

The present invention relates generally to an automotive vehicle washing system. More specifically, the present invention relates to a vehicle washing system with a spray arch having an impact sensing mechanism that automatically resets itself to a home position upon impact with a vehicle to minimize vehicle damage and also to minimize downtime of the vehicle wash system.

2. Description of Related Art

The manufacture, sale, and operation of automotive vehicle washing equipment is big business in the United States and many other countries. The term "automotive vehicle washing", as used herein, refers to wet washing the external surfaces of virtually any type of vehicle from ordinary passenger cars to busses, trucks, vans and even train cars and airplanes.

In one type of vehicle wash system, a vehicle moves through a wash bay beneath washing equipment, including a movable spray arch that emits fluid onto the vehicle as it passes thereunder. During the wash sequence, the spray arch moves upwardly and downwardly with respect to the exterior surface of the vehicle and applies fluid thereto. Thus, the movement of the spray arch must be accurately controlled such that the spray arch does not contact the vehicle during the wash process. Such contact is undesirable as it can cause damage to the vehicle and can also cause damage to the spray arch, which can also necessitate system repairs and likely result in significant system down time. Thus, in the event the vehicle contacts the arch, it is important that the spray arch include a breakaway mechanism to prevent damage to the vehicle or the arch.

The same principles apply to vehicle wash systems where the vehicle remains stationary. In this other system, an overhead gantry or frame moves with respect to the vehicle to emit fluid thereon. The gantry includes a spray arch that travels around the perimeter of the vehicle while performing a vehicle wash sequence typically including the steps of applying soap and subsequently rinsing the vehicle with a high pressure supply of water. During the wash sequence, the spray arch travels along each side of the vehicle and also passes along the front and rear bumpers. Thus, the movement of the spray arch must also be accurately controlled such that it does not contact the vehicle during the wash process. If the control unit for the vehicle wash malfunctions, it is important that the spray arch include a breakaway mechanism to prevent damage to both the spray arch and the vehicle.

In the past, an automatic spray arch for use in a vehicle wash system was mounted by a series of sheer pins that held the spray arch in its operating position. If the spray arch contacted a vehicle or other stationary object in the wash bay, the movement of the spray arch would fracture one of the sheer pins to prevent damage to both the spray arch and the vehicle.

Although the prior sheer pin system functioned well to prevent damage to both the vehicle and the spray arch, a service personnel was required to reset the spray arch and install new sheer pins each time the spray arch was contacted. In many cases, the vehicle wash system would be out of commission for hours, or in extreme cases, days before a service technician could reinstall the sheer pins. Extended periods of downtime due to the breakaway of the spray arch is undesirable and often times very costly to the vehicle wash owner.

Other spray arches for vehicle washing systems have employed some form of breakaway mechanism, such as pressure switches, however, they all suffer from a variety of other disadvantages.

SUMMARY OF THE INVENTION

It is therefore an advantage of the present invention to provide a vehicle washing system with an overhead treatment member or spray arch that can break away from a rigid, operating condition upon contact with a vehicle.

It is another advantage of the present invention to provide a vehicle washing system that automatically resets the overhead treatment member to an operating condition, without human intervention, after application of a minimum predetermined force has been sensed by the member.

It is still another advantage of the present invention to provide a vehicle washing system that returns the overhead treatment member to a home position, without human intervention, after application of a minimum predetermined force.

It is an additional advantage of the invention to provide a vehicle washing system with an overhead treatment member that can breakaway from a normal operating position upon application of a minimal force to minimize damage to a vehicle that may make contact therewith.

It is a further advantage of the present invention to provide a vehicle washing system with an overhead treatment member that can breakaway from a normal operating position upon application of a minimal force to minimize damage to the member itself.

It is yet another advantage of the present invention to provide a vehicle washing system with an overhead treatment member that can automatically reset for subsequent operation in the event part or all of it becomes dislodged from one or more of its retention mechanism.

It is still a further advantage of the present invention to provide a vehicle washing system with an overhead treatment member that can move upwardly and downwardly with respect to a vehicle and can also rotate to vary the angle at which it treats the vehicle.

It is yet a further advantage of the present invention to provide a vehicle washing system with a mechanism for profiling an exterior of the vehicle to provide feedback for the proper orientation of an overhead treatment member for increased system performance.

In accordance with the above and the other advantages of the present invention, a vehicle treatment apparatus for a vehicle cleaning system is provided. The vehicle treatment apparatus includes a frame structure having a pair of vertical side supports that are spaced apart from one another. The pair of vertical side supports have a generally horizontal treatment member extending therebetween. The generally horizontal treatment member has a first end and a second end and is configured to communicate with a vehicle that passes thereunder. Each of the pair of vertical side supports includes a retention mechanism formed therein for engaging a respective one of the first end and the second end of the generally horizontal treatment member and allowing vertical movement therewithin. The generally horizontal treatment member is in communication with a controller to allow substantially vertical movement within each of the retention mechanism from a home position to at least one lower operating position above a portion of the exterior surface of the vehicle. The generally horizontal treatment member is in communication with at least one sensor to monitor application of a force thereto. If the force applied to the generally horizontal treatment member, such as by the vehicle, is greater than a predetermined minimum acceptable force, the generally horizontal treatment member moves vertically upward to the home position and automatically resets for the next operating cycle.

These and other features and advantages of the present invention will becomes apparent to one of ordinary skill in the art from the following description of the invention, when viewed in accordance with the accompanying drawings and appended claims.

BRIEF DESCRIPTION OF THE DRAWING(S)

Advantages of the present invention will be readily appreciated as the same becomes better understood by reference to the following detailed description and the accompanying drawings that set forth an exemplary embodiment wherein.

DETAILED DESCRIPTION OF THE EXEMPLARY EMBODIMENT

Referring to the Figures, a vehicle washing system in accordance with the present invention is illustrated and generally designated by reference number 10. The vehicle washing system 10 includes a vehicle treatment apparatus 12. In the embodiments shown and described, the vehicle treatment apparatus is a high pressure arch that is utilized to emit fluid, such as water, onto the vehicle as part of the vehicle washing process. It will be understood by one of ordinary skill in the art that a variety of other fluids may be emitted from the vehicle treatment apparatus for a variety of purposes. It will also be understood by one of skill in the art that the vehicle treatment apparatus may be utilized for a variety of different functions in the vehicle washing system, including drying functions.

Figure 1:
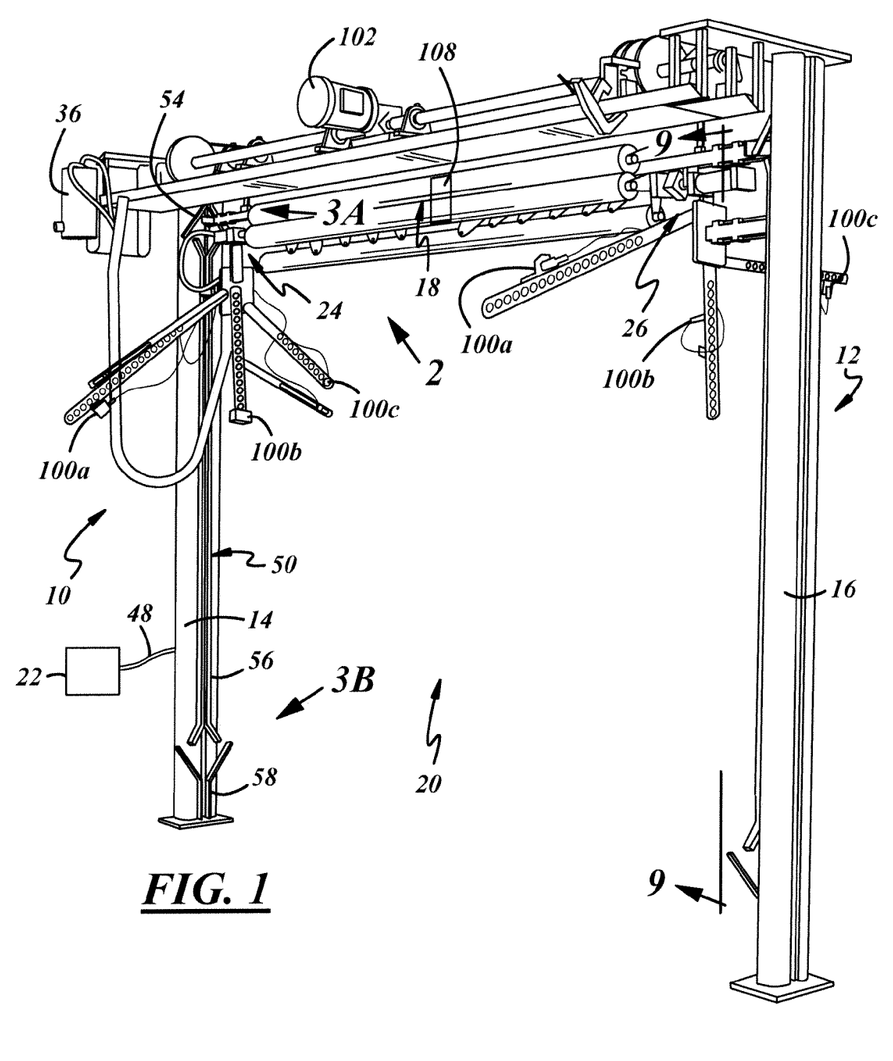
FIG. 1 is a perspective view of a vehicle treatment apparatus as part of a vehicle wash system with a horizontal treatment member in a home position in accordance with one embodiment of the present invention.
Figure 2:
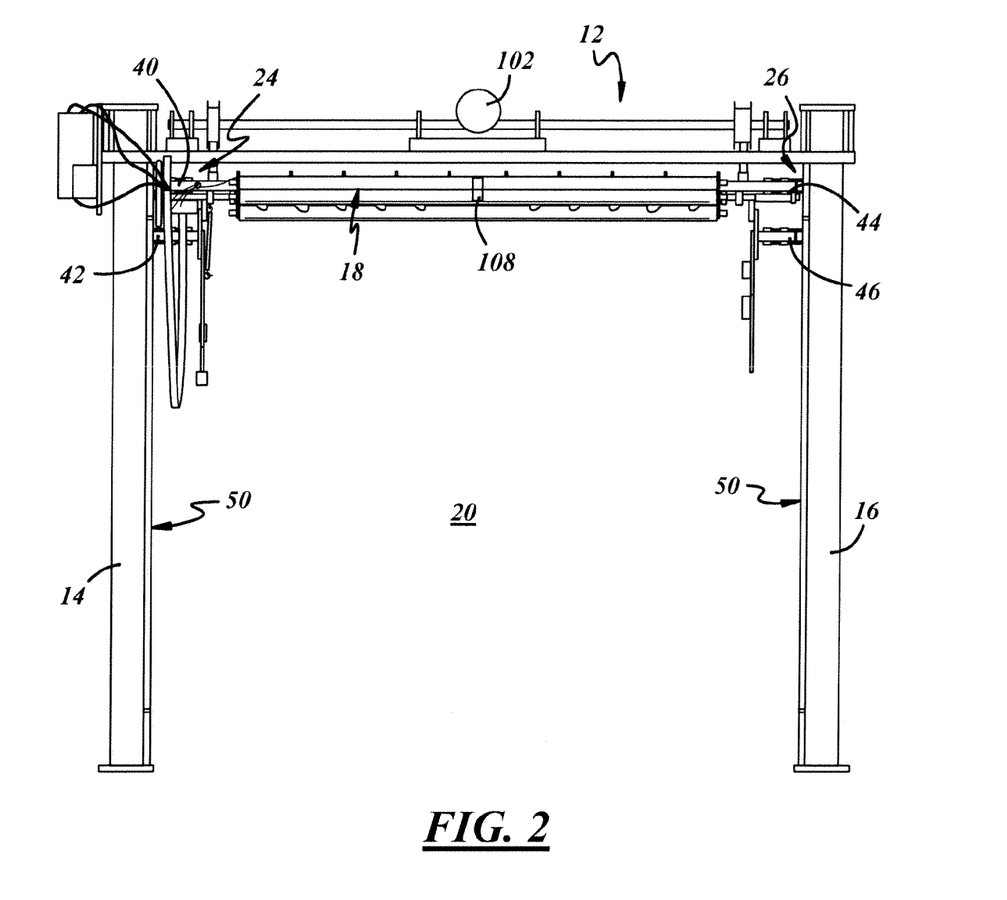
FIG. 2 is a front view of the vehicle treatment apparatus of FIG. 1.

With reference to FIGS. 1 and 2, the vehicle treatment apparatus 12 includes a pair of generally opposing side support sections 14, 16 and a generally horizontal treatment member 18 extending therebetween. The vehicle treatment apparatus 12 defines a vehicle bay 20 beneath the horizontal treatment member 18 and between the side support sections 14, 16 where a vehicle passes during the vehicle washing process. The side support sections 14, 16 are preferably mounted to the floor of the vehicle bay 20, however, they may alternatively be mounted to the ceiling or walls. As is discussed in detail below, the horizontal treatment member 18 is linearly reciprocal upwardly and downwardly with respect to the vehicle bay 20 to communicate with the exterior surface of the vehicle passing therethrough. It will be understood that while the vehicle treatment apparatus 12 is illustrated as incorporated into a vehicle washing system where the vehicle moves with respect to the system, it may also be incorporated into a system where the vehicle is stationary and the treatment apparatus moves with respect to the vehicle.

Figure 4:
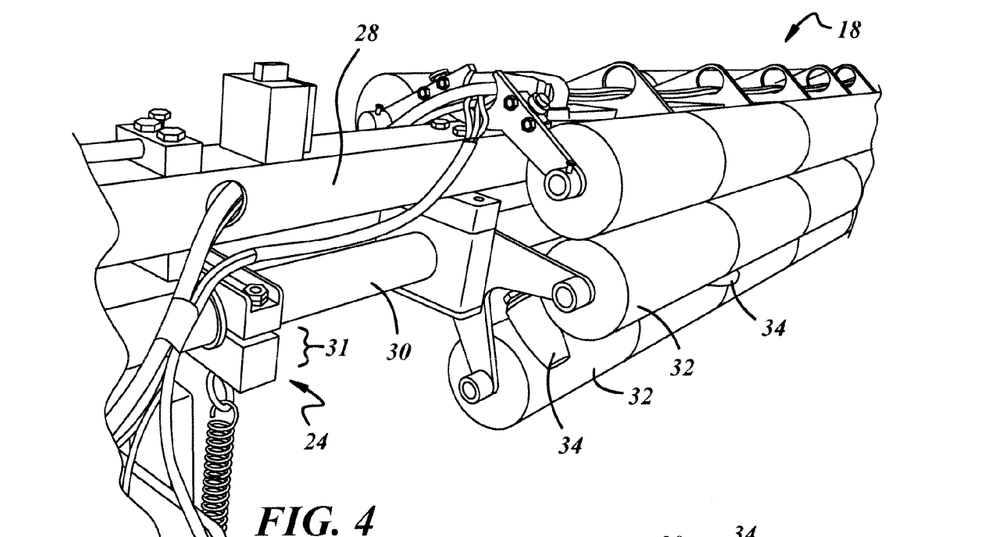
FIG. 4 is a perspective view of a portion of the horizontal treatment member of the vehicle treatment apparatus of FIG. 1.
Figure 5:
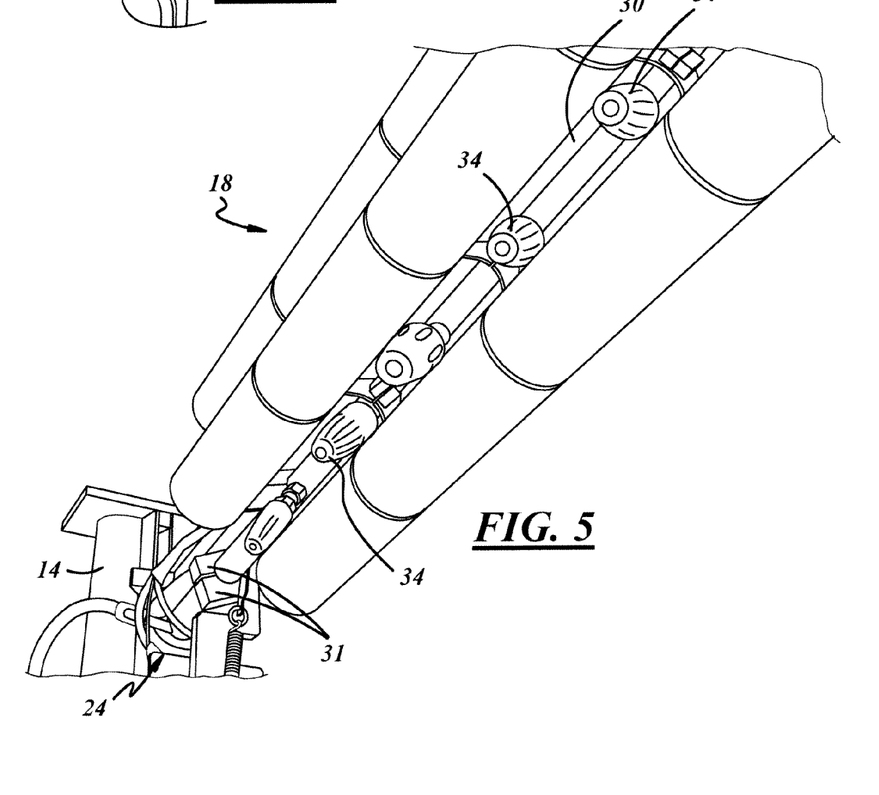
FIG. 5 is a bottom view of a portion of the horizontal treatment member of the vehicle treatment apparatus of FIG. 1.
Figure 6:
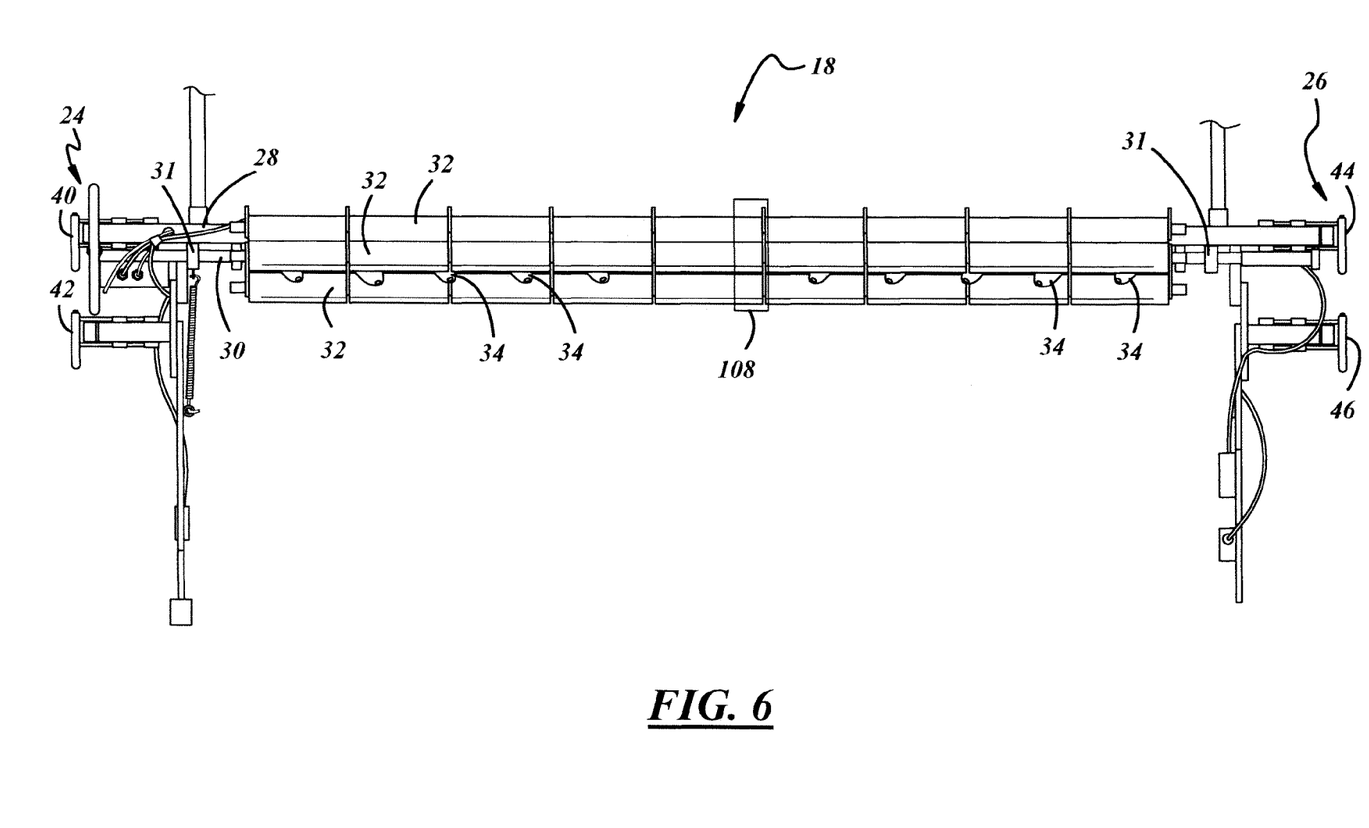
FIG. 6 is a front view of a horizontal treatment member of the vehicle treatment apparatus of FIG. 1.

With reference to FIGS. 4 through 6, the horizontal treatment member 18 is preferably an overhead manifold or high pressure arch that is in communication with a fluid supply 22. The horizontal treatment member 18 includes a first end 24 that communicates with the first side support section 14 and a second end 26 that communicates with a second side support section 16. In one embodiment, the horizontal treatment member 18 includes a rigid support bar 28. The horizontal treatment member 18 also includes a fluid manifold 30, which is coupled by brackets 31 to the rigid support bar 28. A plurality of foam cushions 32 are disposed around the rigid support bar 28 as well as the fluid manifold 30 to provide padding or cushion to minimize damage to a vehicle and/or the member 18 in the event of contact between the vehicle and the horizontal treatment member 18. It will be appreciated that the cushioning members can be made of a variety of suitable materials other than foam that provides adequate protection.

In accordance with this embodiment, a plurality of fluid emitting nozzles 34 are laterally disposed along the length of the fluid manifold 30. The fluid manifold 30 is in communication with the fluid supply 22 through a fluid conduit 48, such as a hose. It will be understood that the fluid can be conveyed to the fluid manifold 30 by a variety of other suitable mechanism. The plurality of fluid emitting nozzles 34 are preferably high pressure nozzles for emitting fluid at a high velocity from the fluid manifold 30 to the exterior of the vehicle. Thus, fluid is transferred from the fluid supply 22 through the fluid conduit 48 into the fluid manifold 30 and then applied to the vehicle by the fluid emitting nozzles 34. Instead of nozzles, other suitable fluid delivery structures may be utilized to apply fluid to the vehicle exterior.

The fluid manifold 30 is in communication with a controller 36 to effectuate movement and rotation of the fluid manifold 30 and cushioning members 32, as discussed in more detail below. It will be understood that while the horizontal treatment member 18 may emit any type of fluid, such as water, soap, wax or other suitable fluids through the nozzles or other fluid delivery structures. Additionally, instead of fluid, the horizontal treatment member 18 may emit warm air to dry the exterior surface of the vehicle. One of ordinary skill in the art will also understand that the horizontal treatment member 18 can also be utilized for a variety of other purposes.

Figure 7:
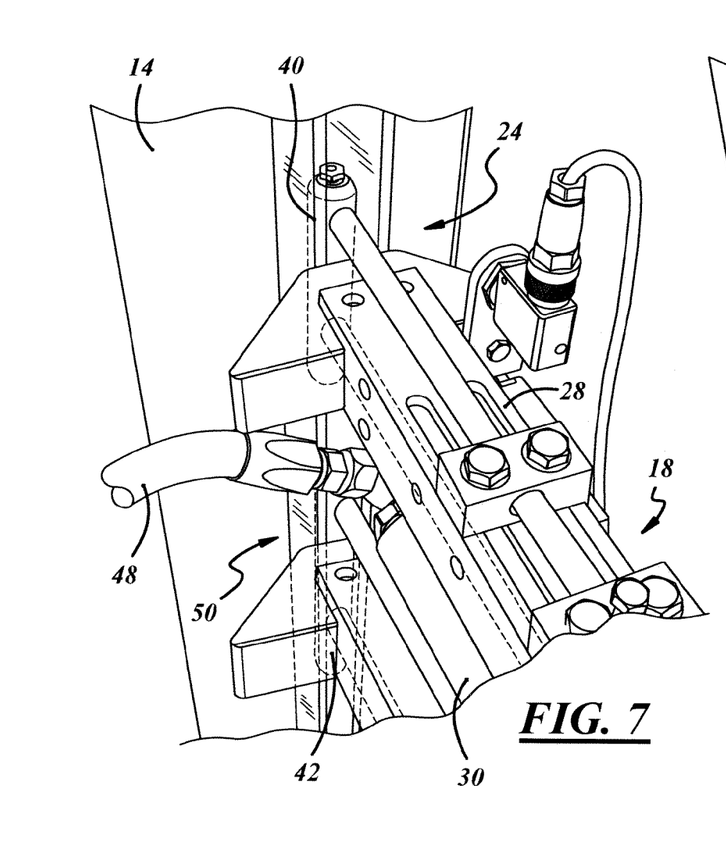
FIG. 7 is a schematic illustration of an end of the horizontal treatment member of the vehicle treatment apparatus positioned in a respective retention mechanism in accordance with one embodiment of the present invention.

With reference to FIGS. 6 and 7, the first end 24 of the horizontal treatment member 18 includes an upper portion 40 and a lower portion 42. Similarly, the second end 26 of the horizontal treatment member 18 includes an upper portion 44 and a lower portion 46.

Figure 3A:
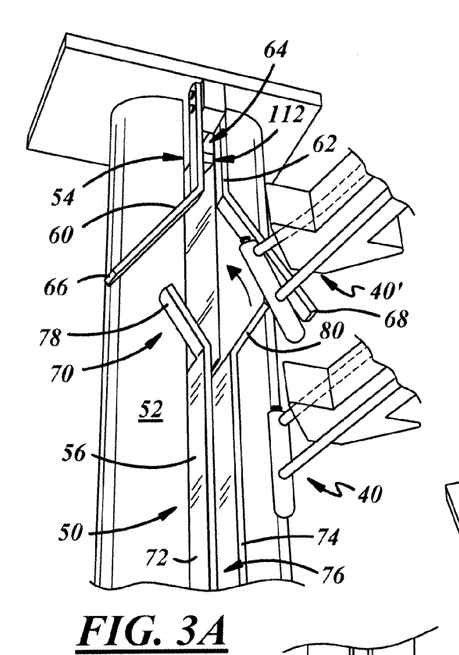
FIG. 3A is a schematic illustration of an upper portion of one side support member of the vehicle treatment apparatus of FIG. 1 with an upper portion of one end of the horizontal treatment member being repositioned into the upper portion of a retention mechanism in accordance with one embodiment of the present invention.
Figure 3B:
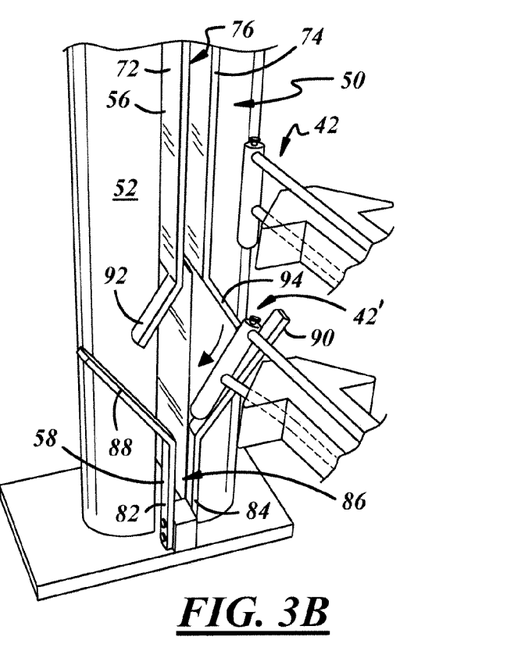
FIG. 3B is a schematic illustration of a lower portion of the side support structure of the vehicle treatment apparatus of FIG. 1 with a lower portion of one end of the horizontal treatment member being repositioned into the lower portion of a retention mechanism in accordance with one embodiment of the present invention.

Turning now to FIGS. 3A and 3B, which illustrate portions of the side support members 14, 16. It will be understood that the configuration of the side support member 14 is the same as the side support member 16 and thus the description of one applies to the other and they have the same reference numbers. As shown, the side support member 14 includes a retention mechanism 50 located on an inner surface 52 thereof. The retention mechanism 50 is intended to slideably receive the entire first end 24 of the horizontal treatment member 18, including both the upper portion 40 and the lower portion 42. The retention mechanism 50 on the other side support member 16 is intended to slideably receive the entire second end 26 of the horizontal treatment member 18, including the upper portion 44 and the lower portion 46.

In one embodiment, the retention mechanism 50 is a channel that consists of an upper segment 54, a middle segment 56, and a lower segment 58. It will be understood that instead of a channel, the retention mechanism 50 may instead be a groove or other suitable structure formed in or on the side support member 14, 16 that allows for vertical movement of the horizontal member 18 therewithin.

The upper segment 54 includes a pair of opposing rails 60, 62 that are generally parallel to one another along their length and receive an end of the horizontal treatment member 18 therebetween. The area 64 between the opposing rails 60, 62 in the upper segment 54 define a home position for the horizontal treatment member 18, as discussed in more detail below. As shown, the opposing rails 60, 62 include lower portions 66, 68 that flare outwardly and downwardly at an angle. The lower portions 66, 68 extend downwardly along the inner surface 52 to a location below the upper end 70 of the middle segment 56.

The middle segment 56 includes a pair of opposing rails 72, 74 that extend generally parallel to one another along their length and receive an end of the horizontal treatment member 18 therebetween. The area 76 between the pair of opposing rails 72, 74 is the location where the horizontal treatment member 18 travels when it is reciprocating during the treatment process, as schematically shown in FIG. 7. As shown, the opposing rails 72, 74 include upper portions 78, 80 that flare outwardly and upwardly at an angle. The upper portions 78, 80 of the middle segment 56 extend outwardly less than the lower portions 66, 68 of the upper segment 54 to assist in repositioning the first end 14 and the second end 16 of the horizontal treatment member 18. The opposing rails 72, 74 include lower portions 92, 94 that flare outwardly and downwardly at an angle.

The lower segment 58 includes a pair of opposing rails 82, 84 that extend generally parallel to one another along their length and receive an end 24, 26 of the horizontal treatment member 18 therebetween. The pair of opposing rails 82, 84 define an area 86 where one of the ends travels. The pair of opposing rails 82, 84 includes upper portions 88, 90 that flare outwardly and upwardly at an angle. The upper portions 88, 90 extend upwardly along the inner surface 52 to a location above the lower end 96 of the middle segment 56. The upper portions 88, 90 of the lower segment 58 extend outwardly further than the lower portions 92, 94 of the middle segment 56 to assist in repositioning the first end 14 and the second end 16 of the horizontal treatment member 18.

It will also be understood that the retention mechanism 50 could include a middle segment 56 only with flared upper and lower portions to assist in repositioning the ends 14, 16 of the horizontal treatment maker. Alternatively, the retention mechanism 50 could include only an upper segment 54 and a middle segment 56. It will also be understood that retention mechanism having a variety of different configurations may also be employed.

As shown in the Figures, each end 24, 26 of the horizontal treatment member 18 includes a plurality of sensors 100 in communication therewith. The sensors 100 are mounted to each end 24, 26 of the horizontal treatment member 18 such that they move up and down with the member as it travels. In one embodiment, the sensors 100 are a plurality of photo eyes. The photo eyes 100 disposed adjacent the first end 24 communicate with the photo eyes 100 adjacent the second end 26 by emitting beams therebetween. This allows the photo eyes to communicate with one another and also to determine the location of the vehicle. For example, if the line of sight between opposing photo eyes is interrupted, it means the vehicle is positioned therebetween and the horizontal treatment member 18 should be raised. In the disclosed embodiment, three sensors are disposed adjacent each end 24, 26. There is a forward sensor 100a, a middle sensor 100b, and a rear sensor 100c. Each of the sensors is in communication with a controller 36. The sensors utilize a computer program to perform triangulation to map the exterior surface of the vehicle and to signal the controller 36 to raise and lower and rotate the horizontal treatment member 18 as required. It will be understood that more or less sensors 100 may be utilized and that they may take on a variety of different positions and configurations.

Referring now to FIGS. 10 through 13, which schematically illustrate the operation of the vehicle treatment apparatus 12 in accordance with the present invention. As shown, the vehicle treatment apparatus 12 begins each cycle in a home position, shown in FIGS. 1 and 2, where it is located in the upper segment 54 of the retention mechanism 50. In the home position, the horizontal treatment member 18 is at rest in the upper segment 54 of the retention mechanism 50 and ready for operation. In the home position, both the first end 24 and the second end 26 of the horizontal treatment member 18 are fully disposed in their retention mechanism 50.

During the vehicle cleaning process, the vehicle moves through the vehicle bay 20, such as by way of a conveyer or other mechanism that moves the vehicle with respect to the vehicle washing system 10. As the vehicle moves through the vehicle washing system 10 and approaches the vehicle treatment apparatus 12, a signal is sent to the controller 36 to inform it that a vehicle is approaching and to prepare for operation. This signal can be triggered in a variety of suitable ways as will be understood by one of ordinary skill in the art. In accordance with one embodiment, the controller 36 signals a motor 102 in communication with the horizontal treatment member 18 to lower it from the home position to a lower intermediary position.

At the appropriate time, the controller 36 lowers the horizontal treatment member 18 into a position so as to communicate with the exterior surface of the vehicle based on feedback from the sensors 100 as to the proper height. At this time, the controller 36 sends a signal to valving (not shown) to allow fluid from the fluid supply 22 to be delivered to the fluid manifold 30 and then emitted from the fluid emitting nozzles 34 onto the vehicle. The controller 36 preferably lowers the horizontal treatment member 18 before the vehicle reaches the vehicle treatment apparatus 12 such that the fluid can be emitted onto the entire vehicle exterior. As will also be understood by one of ordinary skill, the sensors 100 on each side of the horizontal treatment member 18 continually provide feedback to the controller 36 as to the configuration of the vehicle exterior. Based on this feedback, the controller 36 sends a signal to the motor 102 to raise and lower the bar as necessary to properly map and track the exterior of the vehicle.

Figure 10:
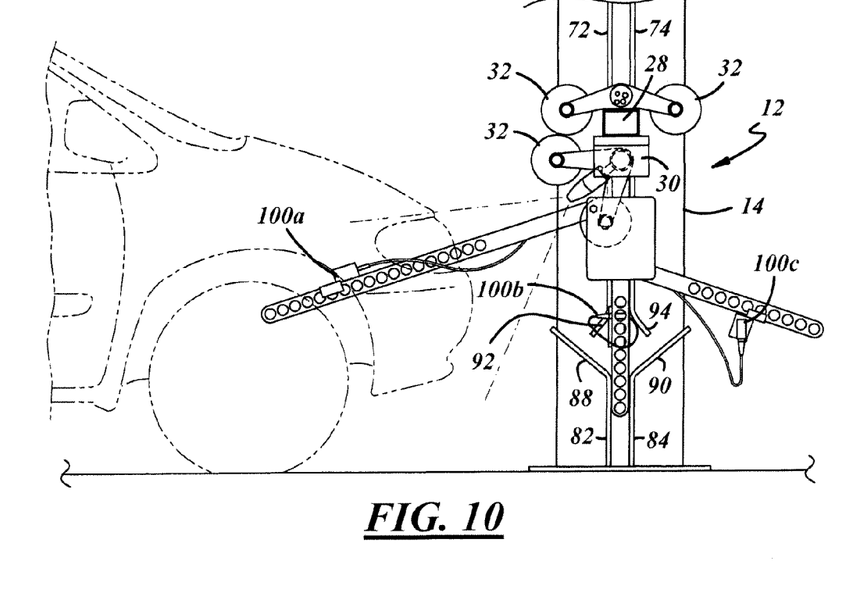
FIG. 10 is a schematic illustration of a vehicle treatment apparatus with a horizontal treatment member in a first lowered position to communicate with an exterior of a vehicle in accordance with one embodiment of the present invention.
Figure 11:
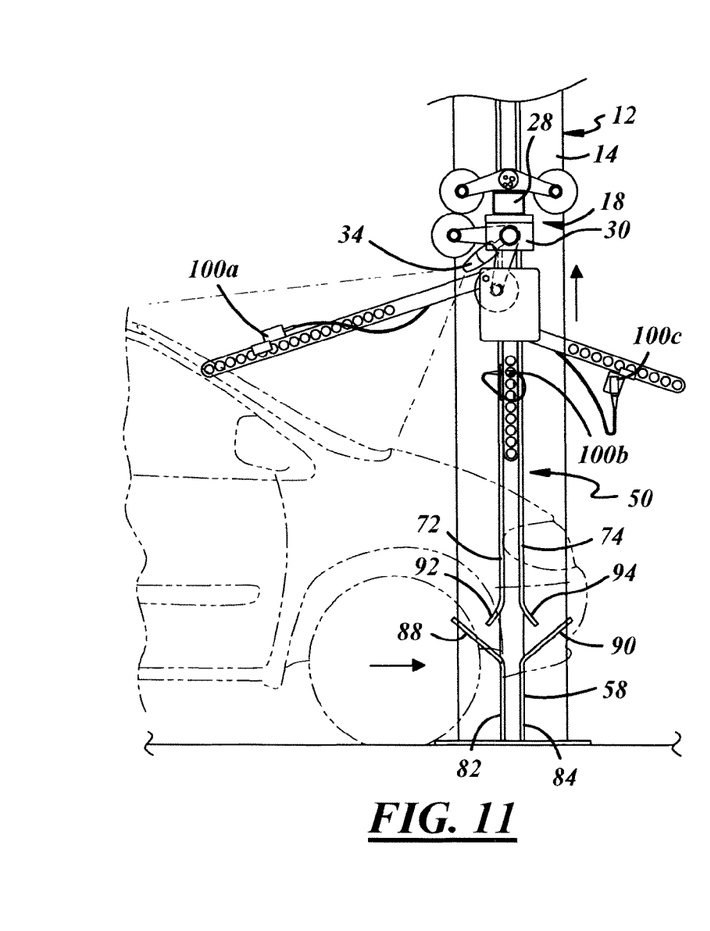
FIG. 11 is a schematic illustration of a vehicle treatment apparatus with a horizontal treatment member in a second lowered position to communicate with an exterior of a vehicle in accordance with one embodiment of the present invention.

For example, in FIG. 10, the horizontal treatment member 18 is in a first lowered position, such as to engage a hood and/or front of a vehicle. As the vehicle continues to move forward, the sensors 100 determine the increasing height of the vehicle, such as due to the windshield and the roof, such as is shown in FIG. 11. This information is received by the controller 36, which acts to raise the horizontal treatment member 18 to a higher position so that it is disposed above the surface of the vehicle to emit fluid onto the vehicle. This information and subsequent control prevents the horizontal treatment member 18 from being contacted by the vehicle.

The controller 36 is also in communication with the fluid manifold 30 to effectuate rotation thereof as necessary to direct the flow of fluid from the plurality of fluid nozzles 34 in a variety of different directions. In operation, the controller 36 receives feedback from the sensors 100a, 100b, 100c on each side 24, 26 of the horizontal treatment member 18 regarding the configuration of the exterior of the vehicle. Based on the configuration, the controller 36 can rotate the fluid manifold 30 and thereby change the angle at which the fluid emitting nozzles 34 apply fluid to the exterior surface of the vehicle.

Figure 12:
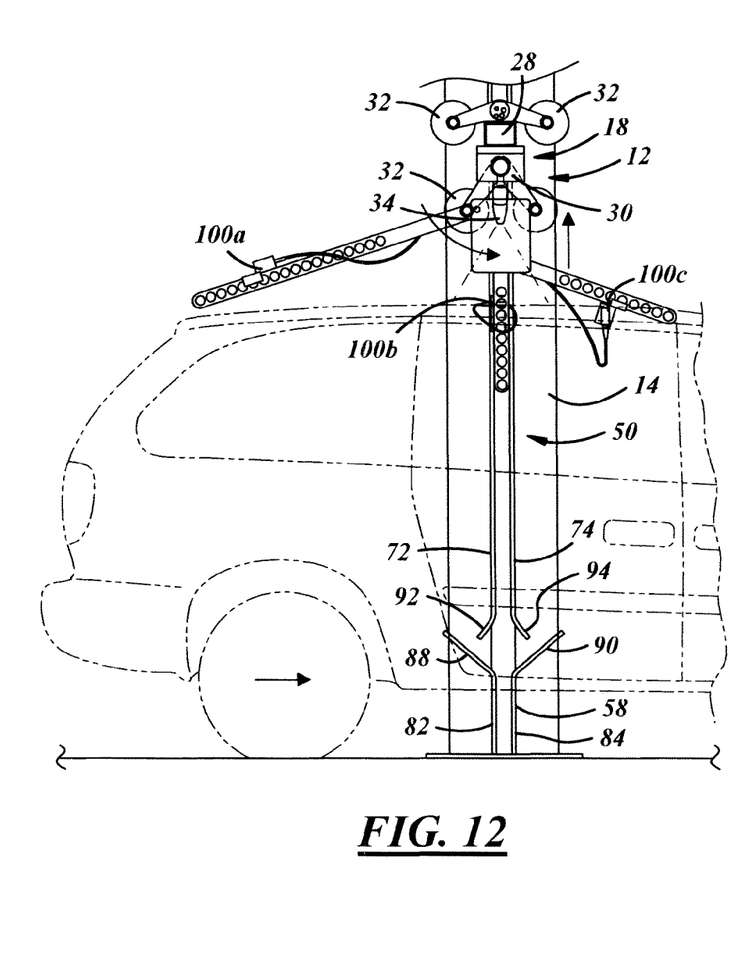
FIG. 12 is a schematic illustration of a vehicle treatment apparatus with a horizontal treatment member in a third lowered position as well as rotated to communicate with an exterior of a vehicle in accordance with one embodiment of the present invention.

For example, the fluid manifold 30 can initially be rotated to an angle such that the fluid emitting nozzles 34 direct fluid onto the front grill or surface of the vehicle at an angle. For purposes of reference, this direction is referred to as "rearward" since the fluid is pointed in a direction toward the rear of the vehicle. Also, for purposes of reference, when the fluid emitting nozzles 34 are directed straight down or perpendicular to the ground. This is referred to as a "zero angle" position. Thereafter, when the hood of the vehicle is to be treated, the fluid manifold 30 can be rotated to a zero angle position such that the fluid emitting nozzles 34 direct fluid straight downward onto the hood, such as shown in FIG. 12. At the same time, the horizontal treatment member 18 is raised in response to input from the controller 36 to prevent inadvertent contact with the vehicle. Alternatively, the angle of fluid manifold 30 and the fluid emitting nozzles 34 could remain the same as at the front of the vehicle, namely oriented to direct the fluid rearwardly. As the vehicle progresses forwardly, the horizontal treatment member 18 is raised such that it remains above the exterior of the vehicle.

Figure 13:
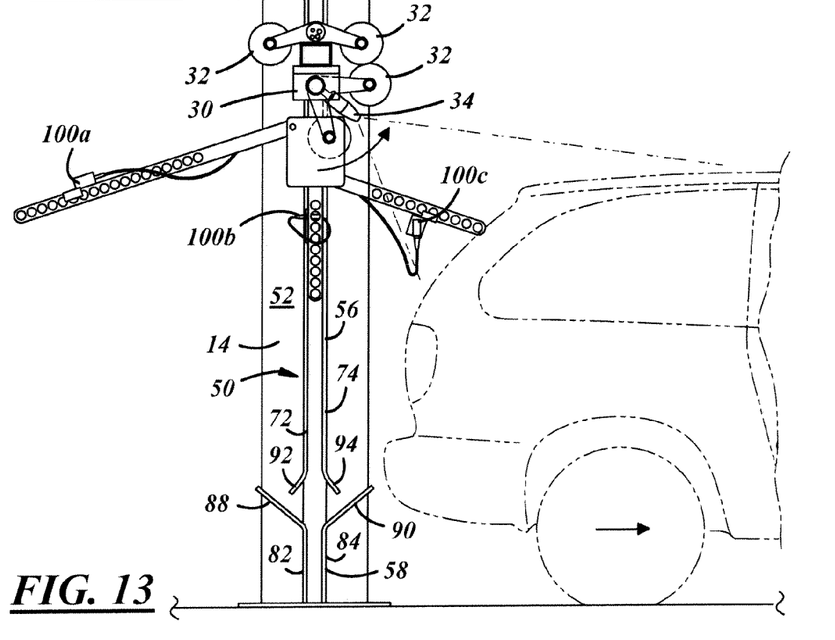
FIG. 13 is a schematic illustration of a vehicle treatment apparatus with a horizontal treatment member in another rotated position to communicate with an exterior of a vehicle from a different position or angle in accordance with one embodiment of the present invention.

In accordance with one embodiment, as the vehicle moves under the vehicle treatment apparatus 12 in certain circumstances, the controller 36 can rotate the fluid manifold 30 such that the fluid emitting nozzles 34 direct fluid forwardly, i.e. toward the front of the vehicle, such as is shown in FIG. 13. Instances where this may be desirable would be to wash the rear windows of the pick up truck or to wash the rear of the vehicle. Obviously, there are a variety of other situations where rotating the fluid manifold 30 to vary the attack angle of the fluid emitting nozzles 36 may be desirable. Thus, based on feedback from the sensors 100, the controller 36 can rotate the fluid manifold 30 to change the angle of attack of the fluid emitting nozzles 34 to provide increased coverage and therefore increased cleaning as desired. Once the vehicle has passed under the vehicle treatment apparatus 12, the controller 36 sends a signal that the operation is over and the horizontal treatment member 18 is returned to the home position (FIG. 1).

In accordance with a preferred embodiment of the present invention, the vehicle treatment apparatus 12 includes a breakaway function and mechanism to sense if it has moved from the normal operating position shown in FIG. 7. The breakaway function is intended to protect the vehicle and the vehicle treatment apparatus 12 in the event of inadvertent contact therebetween. In one embodiment, the vehicle treatment apparatus 12 includes sensors 100 on either side 24, 26 of the horizontal treatment member 18 to detect rearward movement of the horizontal treatment member 18 to actuate the breakaway function. If the sensors 100 detect rearward movement of the horizontal treatment member 18 of a certain magnitude, it means a force has been applied thereto. In this circumstance, a signal is then set to the controller 36 to reset the device by returning the horizontal treatment member 18 to a home position. In accordance with another embodiment, a loop switch 108 is disposed on the horizontal treatment member 18. It will be understood that a variety of different sensors may be utilized to detect unintended movement of the horizontal treatment 18 and thus force thereto.

Figure 8:
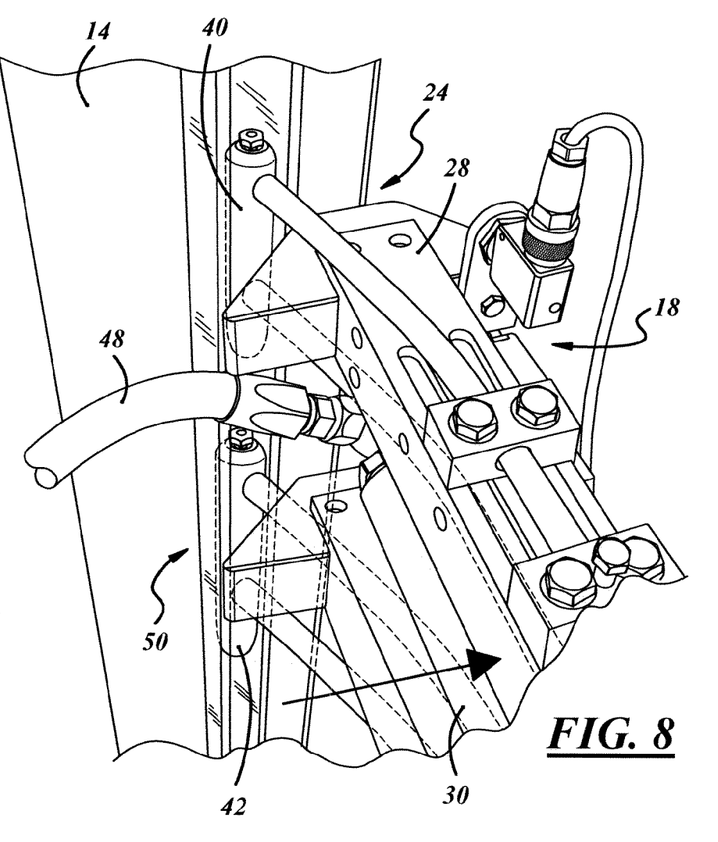
FIG. 8 is a schematic illustration of a vehicle treatment apparatus with a horizontal treatment member subjected to a force, but not dislodged from a respective retention mechanism, in accordance with one embodiment of the present invention.

In accordance with one embodiment, the loop switch 108 is set to detect a force of a minimum predetermined magnitude applied to the horizontal treatment member 18. If the force applied to the loop switch 108 and thus the horizontal treatment member 18, such as by the vehicle, is greater than the predetermined magnitude, the controller 36 signals the motor to retract the horizontal treatment member 18 to its home position and reset the device. This occurs regardless of whether either end 24, 26 of the horizontal treatment member 18 has been dislodged from its respective retention mechanism 50. An example of such a condition is shown in FIG. 8, where a force has been applied to the horizontal treatment member to flex the upper portion 40 and the lower portion 42, but where the force is not sufficient to dislodge the end from the retention mechanism 50.

In the event the force applied to the horizontal treatment member 18 is sufficient to dislodge the first end 24 and the second end 26, the ends 24, 26 are automatically repositioned within their respective retention mechanism 50 to reset the horizontal treatment member 18 for further application. This occurs in the same fashion discussed above, namely, the loop switch 108 senses a force and notifies the controller 26 which retracts the horizontal treatment member 18 to its home position. The condition where both the first end 24 and the second end 26 of the horizontal treatment member 18 have been dislodged from their respective retention mechanism will be readily apparent from the foregoing description of the invention in accordance with the drawings.

In the event the first end 24 and the second end 26 of the horizontal treatment member 18 are dislodged from their respective retention mechanism 50, the ends 24, 26 are automatically repositioned into their respective retention mechanism 50 as the horizontal treatment member 18 is being moved to the home position. In operation, if a force of a sufficient magnitude is applied to the horizontal treatment member 18, the ends 24, 26 are dislodged from the respective retention mechanism 50. The horizontal treatment member 18 is in communication with the motor 102 by a pair of cables which attach to either end 24, 26 and retract to raise the horizontal treatment member 18 via opposing pulleys. In the event the ends 24, 26 are dislodged, the cables which are secured to the horizontal treatment member 18 allow it to swing outwardly. However, because the cables are being retracted, the horizontal treatment member 18 returns into contact with the rails. Thus, as the horizontal treatment member 18 is being retracted upwardly, the dislodged ends 24, 26 contact the outside of the rails 72, 74 of the retention mechanism 50. As the ends pass the upper portions 78, 80 of the middle segment 56, they contact the flared lower portions 66, 68 of the upper segment 58 to reposition the ends 24, 26 in the retention mechanism 50. The flared lower portions 66, 68 of the upper segment 58 act as a funnel to channel and reposition the first end 24 and the second end 26 of the horizontal treatment member 18 in the retention mechanism 50 for further operation. As shown in FIG. 3A, the upper portion 40 is repositioned when in the position designated by reference number 40' where it contacts the flared portion 68.

Figure 9:
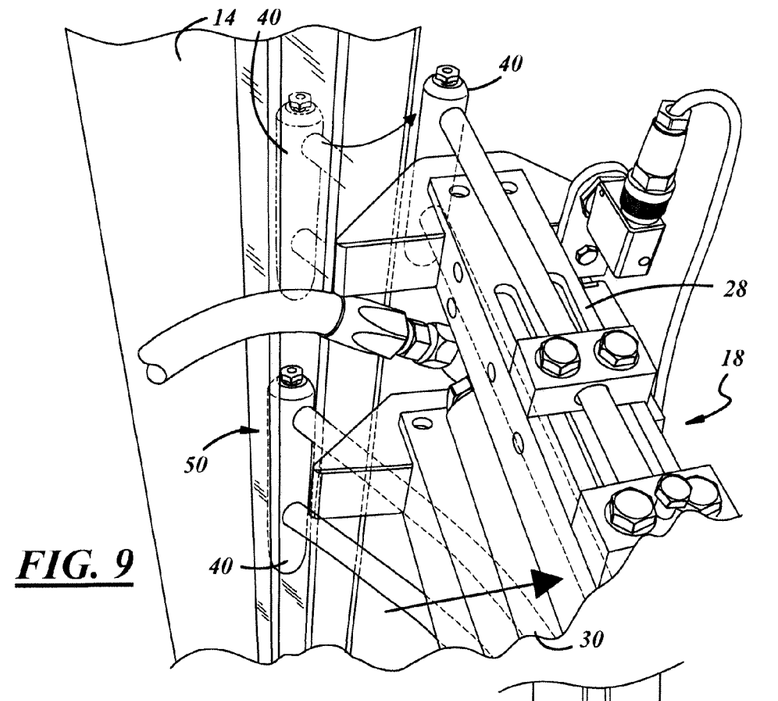
FIG. 9 is a schematic illustration of a vehicle treatment apparatus with a horizontal treatment member partially broken away from a normal operating position in accordance with one embodiment of the present invention.

It will be understood by one of ordinary skill in the art that this occurs regardless of whether only one end or both ends of the horizontal treatment member 18 have been dislodged. This serves to reposition both ends for subsequent operation. Indeed, the condition where only one end is dislodged is shown in FIG. 9. In this condition, the controller 36 resets itself in the same member discussed above.

It will also be appreciated that the ends 24, 26 each include an upper portion 40, 44 and a lower portion 42, 46. The upper portions 40, 44 and the lower portions 42, 46 of each ends 24, 26 can also be individually dislodged depending upon the magnitude of the force applied to the horizontal treatment member 18 as sensed by the loop switch 108. For example, in the event the force applied to the horizontal treatment member 18 only dislodges the upper portions 40, 44, as the horizontal treatment member 18 returns to its home position, the upper portions 40, 44 are repositioned in the retention mechanism 50 by the flared lower portions 66, 68 of the rails 60, 62, as schematically shown in FIG. 3A. A detection mechanism 112 is located in the upper segment 58. The detection mechanism 112 provides feed back to the controller 36 when the upper ends 40, 44 are properly repositioned. If the detection mechanism 112 does not sense anything, the controller 36 will know that the horizontal treatment member 18 is not ready for subsequent operation.

If, however, in the event the force applied to the horizontal treatment member 18 dislodges the lower portions 42, 46, whether alone or together with the upper portions 40, 44, the horizontal treatment member 18 returns to its home position. As it returns to its home position, to the extent one or more of the upper portions 40, 44 have been dislodged, they contact the flared lower portions 66, 68 of the rails 60, 62 to reposition them in the retention mechanism 50. In accordance with the preferred embodiment, the lower portions 42, 46 will not be repositioned as the horizontal treatment member 18 does not travel high enough up to reposition them.

In the event of this condition, when the horizontal treatment member 18 is lowered, a lower detection mechanism 114 is disposed in the middle segment 60 will detect the absence of the lower portions 42, 46 from the retention mechanism 50. In this event, the horizontal treatment member 18 will continue traveling downwardly based on instruction from the controller 36 until the lower portions 42, 46 of the ends 24, 26 are repositioned into the retention mechanism by the upper portion of rails 82, 84. As shown in FIG. 3B, the lower portion 42 is repositioned when in the position designated by reference number 42' where it contacts the flared portion 90. The fully repositioned horizontal treatment member 18 can then be returned to the home position (FIG. 1) in a fully reset position for subsequent processing.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A vehicle treatment apparatus for a vehicle cleaning system, comprising:
   a frame structure having a pair of vertical side supports that are spaced apart from one another;
   a generally horizontal treatment member extending between said pair of vertical side supports and having a first end and a second end, said generally horizontal treatment member being configured to communicate with a vehicle disposed thereunder;
   a retention mechanism formed in each of said pair of vertical side supports for engaging a respective one of said first end and said second end of said generally horizontal treatment member;
   said generally horizontal treatment member in communication with a controller to allow substantially vertical movement within each of said retention mechanism from a home position to at least one lower position where it communicates with the vehicle;
   whereby if a force applied to said generally horizontal treatment member is sufficient to dislodge one or both of said first end and said second end from said respective retention mechanism, said generally horizontal treatment member moves vertically upward to reset said one or more dislodged ends into the retention mechanism for subsequent application.

2. The system of claim 1, further comprising:
   a sensor in communication with said generally horizontal treatment member to sense application of said force thereto and communicate that to a controller to retract said generally horizontal treatment member to said home position.

3. The system of claim 2, wherein said sensor is a loop switch mounted on said generally horizontal treatment member.

4. The system of claim 1, where each of said retention mechanisms has an upper portion and a middle portion, said upper portion having lower ends that are flared outwardly with respect to an axis generally defined by a direction of vertical movement of said generally horizontal treatment member.

5. The system of claim 4, wherein said lower ends of said upper portion assist in repositioning said first end and/or said second end into said retention mechanism for subsequent application.

6. The system of claim 4, wherein each of said retention mechanism also includes a lower portion having a pair of upper ends that flare outwardly with respect to said axis, said upper ends being intended to reposition at least one of said first end or said second end into said respective retention mechanism.

7. The system of claim 1, wherein said retention mechanism consists of a vertical channel formed on an inner surface of each of said pair of vertical side supports.

8. The system of claim 1, wherein said generally horizontal treatment member is rotatable about a horizontal axis oriented generally parallel to a centerline of said generally horizontal treatment member.

9. The system of claim 1, wherein said generally horizontal member is an overhead manifold that includes a plurality of fluid delivery structures that emit fluid onto the vehicle.

10. The system of claim 9, wherein said plurality of fluid delivery structures consist of a plurality of nozzles.

11. The system of claim 1, wherein each of said first end and said second end has a plurality of photo eyes associated therewith to assist in positioning said generally horizontal member with respect to an outer surface of the vehicle.

12. A high pressure fluid applicator arch for use in a vehicle wash system, comprising:
a frame structure having a right side support structure and a left side support structure;
a right side retention mechanism disposed on an inside surface of said right side support structure;
a left side retention mechanism guide disposed on an inside surface of said left side support structure;
an overhead manifold having a right end that is received in said right side retention mechanism and a left end that is received in said left side retention mechanism, said overhead manifold being vertically reciprocal between a home position and a plurality of operating positions;
a plurality of fluid delivery structures coupled to said overhead manifold to emit fluid to an exterior of the vehicle;
a sensor in communication with said overhead manifold to sense physical contact with said overhead manifold that has a magnitude greater than a predetermined minimum;
a controller in communication with said sensor to move said overhead manifold to said home position when said sensor determines that said force is greater than said predetermined minimum and to reset said generally overhead manifold in the event one or both of said first and second ends becomes dislodged from said respective retention mechanism.

13. The system of claim 12, wherein said right side retention mechanism and said left side retention mechanism each have side rails that are generally parallel to each other to assist in retaining said right end and said left end therein and wherein said side rails have a gap formed therein.

14. The system of claim 13, wherein said controller effectuates rotation of said overhead manifold about a horizontal axis defined by a centerline of said overhead manifold to allow fluid to be directed onto the vehicle in a variety of different directions.

15. The system of claim 13, wherein each of said first end and said second end have a plurality of photo eyes associated therewith to assist in positioning said overhead manifold with respect to said exterior of the vehicle.

16. The system of claim 15, wherein each of said first end and said second end have three photo eyes associated therewith that utilize triangulation to properly position said overhead manifold with respect to said exterior of the vehicle.

17. The system of claim 13, wherein said plurality of fluid delivery structures consist of a plurality of nozzles.

18. The system of claim 13, wherein said each of said side rails on both said right side support and said left side support are angled downwardly and outwardly above said gap with respect to a centerline of said respective retention mechanism to reposition said overhead manifold into each of said retention mechanism when said overhead manifold is being retracted upward.

19. The system of claim 12, wherein said sensor is a loop switch.

20. A method of treating an exterior of a vehicle during a vehicle cleaning process, comprising:
providing a generally horizontal overhead member that is moveable upwardly and downwardly as required during the vehicle cleaning process;
locating each end of said overhead member in a respective channel on one of a pair of opposing side supports;
raising and lowering said overhead member with respect to the exterior of the vehicle to treat the exterior during the vehicle cleaning process;
detecting a force applied to said overhead member by the vehicle that is greater than a predetermined magnitude;
retracting said overhead member upwardly within each of said channels if said force is greater than said predetermined magnitude; and
automatically repositioning said overhead member into each of said channels while said overhead manifold is being retracted if said force is sufficient to dislodge at least one of said ends of said overhead manifold from said respective channel.

21. The method claim 20, further comprising:
rotating said overhead member about a horizontal axis defined by a centerline of said overhead member to treat a variety of different surfaces of the exterior in a variety of different directions.

22. The method of claim 20, further comprising:
sensing the configuration of the exterior of the vehicle;
determining whether to raise or lower said overhead manifold; and
determining whether to rotate said overhead manifold.

23. The method of claim 22, wherein a plurality of photo eyes are associated with each of said first end and said second end to sense the configuration of the exterior of the vehicle.

24. The method of claim 22, wherein the configuration of the exterior of the vehicle is sensed through triangulation.

* * * * *

UNITED STATES PATENT AND TRADEMARK OFFICE
CERTIFICATE OF CORRECTION

| | |
|---|---|
| PATENT NO. | : 7,784,475 B2 |
| APPLICATION NO. | : 12/033211 |
| DATED | : August 31, 2010 |
| INVENTOR(S) | : Robert J. Wentworth et al. |

It is certified that error appears in the above-identified patent and that said Letters Patent is hereby corrected as shown below:

Column 3, Line 9 "becomes" should read -- become --.

Signed and Sealed this

Second Day of November, 2010

David J. Kappos
*Director of the United States Patent and Trademark Office*